Oct. 6, 1964 H. M. GEYER 3,151,493
ELECTROMECHANICAL ACTUATOR SERVO SYSTEM
Filed Aug. 3, 1961
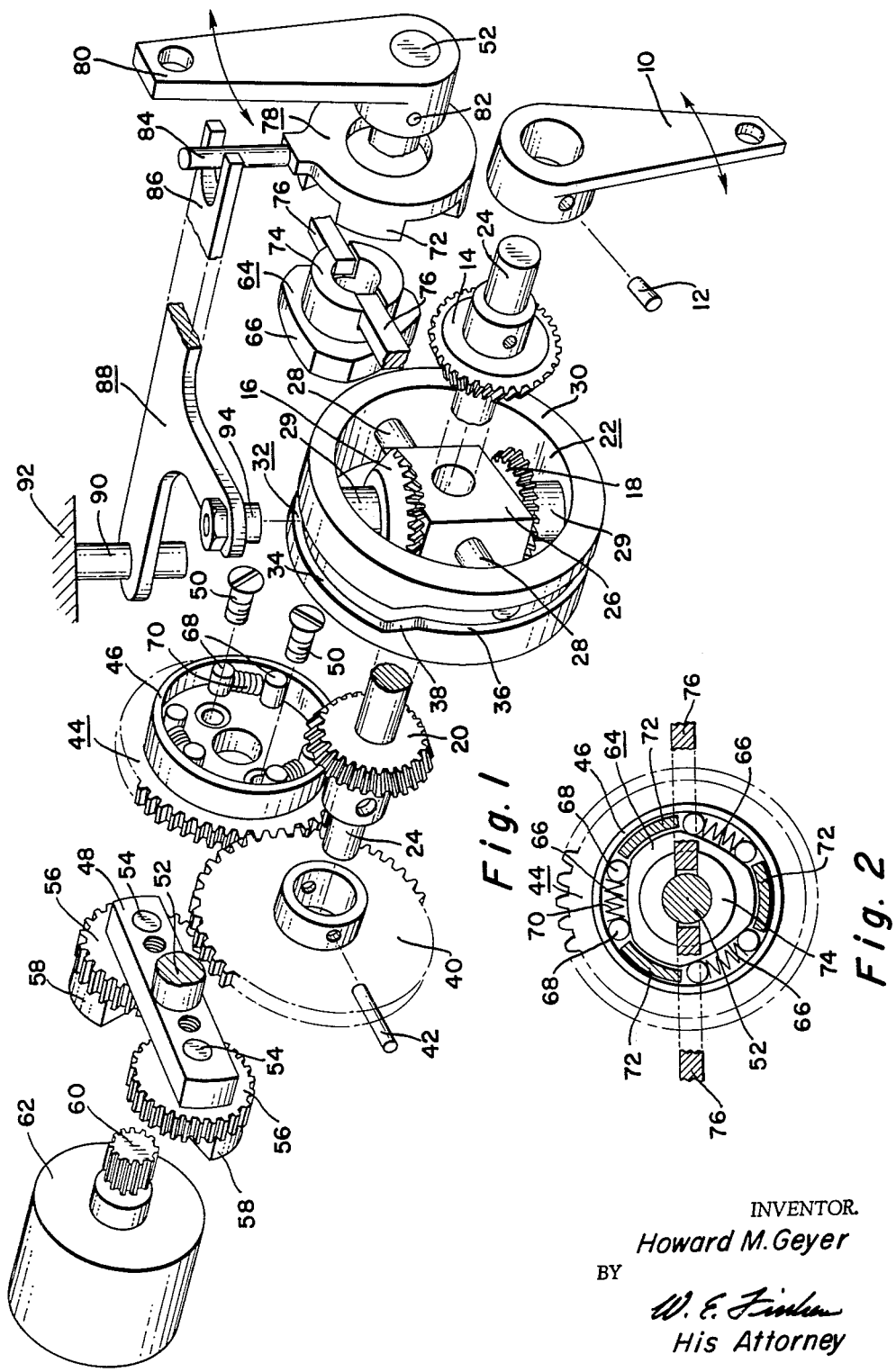
INVENTOR.
Howard M. Geyer
BY
W. E. Finken
His Attorney United States Patent Office 3,151,493
Patented Oct. 6, 1964

3,151,493
ELECTROMECHANICAL ACTUATOR
SERVO SYSTEM
Howard M. Geyer, Dayton, Ohio, assignor to General Motors Corporation, Detroit, Mich., a corporation of Delaware
Filed Aug. 3, 1961, Ser. No. 129,091
8 Claims. (Cl. 74—388)

This invention pertains to closed loop servo systems, and particularly to a closed loop servo system including an electromechanical actuator.

In my copending application Serial No. 71,297, filed November 23, 1960, now Patent No. 3,102,437, an electromechanical actuator utilizing the mass inertia principle is disclosed wherein output movement is controlled by a bidirectional drive release brake. This invention relates to a closed loop servo system embodying a similar type actuator wherein the output member can be precisely positioned in accordance with movement of the input member through a mechanical follow-up system. In this type of system any movement of the input member from a null position whereat the bidirectional drive release brake is engaged releases the brake so as to enable the actuator to drive the output member throughout the same angular distance as the input member whereat the brake is automatically reengaged with the input member again in the null position. Accordingly, among my objects are the provision of a closed loop servo system for controlling electromechanical actuator; the further provision of a closed loop servo system for controlling an electromechanical actuator of the mass inertia type; and the still further provision of a servo system of the aforesaid type including bidirectional drive release brake for controlling the output movement of the actuator.

The aforementioned and other objects are accomplished in the present invention by utilizing an electric motor to drive a pair of eccentrically weighted gears and a cam actuated mechanical follow-up system for controlling a bidirectional drive release brake. Specifically, the servo system includes an input member coupled to an input gear of a differential for actuating a cam. The cam positions a cam follower carried by a linkage for selectively releasing the bidirectional drive release brake for rotation in one direction or the other. The continuously rotating eccentrically weighted gears produce turning moments, or torque impulses, in opposite directions such that when the brake means is released to permit rotation in a given direction, the output member will be driven in such direction. At the same time the cam is repositioned through actuator or driven gearing by the differential such that when the output member has been moved through precisely the same angular distance as the input member, the brake means will be reengaged to thereby arrest further movement of the output member.

Further objects and advantages of the present invention will be apparent from the following description, reference being had to the accompanying drawing, wherein a preferred embodiment of the present invention is clearly shown.

In the drawing:

FIGURE 1 is an exploded perspective view, partly in section and partly in elevation, depicting the closed loop servo system of this invention.

FIGURE 2 is a fragmentary view, partly in section and partly in elevation, of the bidirectional roller noback.

With reference to FIGURE 1, the closed loop servo system of this invention includes an input member 10, in the form of a lever, connected by a pin 12 to the hub of an input bevel gear 14 constituting a component of a differential gear set 22. The differential gear set includes, in addition to the input gear 14, bevel gears 16, 18 and 20. The input bevel gear 14 is journalled on a shaft 24. The shaft 24 extends through and is journalled in a block 26 supported by pins 28 within a ring, or annulus, 30 having a peripheral cam groove 32. The peripheral cam groove 32 comprises axially spaced portions 34 and 36 interconnected by an inclined, or oblique, portion 38. The side walls of the axially offset portions 34 and 36 of the cam groove 32 lie in parallel planes which are normal to the axis of the ring 30.

The output bevel gears 16 and 18 are rotatably supported on two diametrically opposed pins 29 and mesh with the bevel gear 14 as well as the follow-up input bevel gear 20. The follow-up bevel gear 20 is drivingly connected to both the shaft 24 and the hub of a spur gear 40 by a cross pin 42. The spur gear 40 meshes with a spur gear 44 having an integral axially extending skirt, or annular flange, 46 constituting a component of the bidirectional drive release brake. The spur gear 44 is connected to a carrier 48 by a pair of bolts 50. The carrier 48 is suitably connected to a shaft 52 and carries a pair of stub shafts 54 on opposite sides of the shaft 52 on which planet gears 56 are journalled. The planet gears 56 carry eccentric weights 58, and mesh with a centrally arranged sun gear 60 driven by a unidirectional electric motor 62.

The undirectional electric motor 62 may be continuously energized when the servo system is to be used so as to rotate the sun gear 60 and the planet gears 56 about their own axes. During rotation of eccentrically weighted planet gears 56, turning moments, or torque impulses, in opposite directions are imposed upon the planet carrier 48. These torque impulses are in turn imparted to the spur gear 44 and the annulus 46 of the bidirectional drive release brake.

Referring to FIGURE 2, the bidirectional brake comprises a stationary cam 64 having three circumferentially spaced peripheral flates 66, the cam being coaxially mounted within the annulus 46. A pair of rollers 68 are mounted on each flat 66, the rollers 68 being biased away from each other by a spring 70 into wedging engagement between the cam 64 and the inner periphery of the annulus 46. Three arcuate lock release fingers 72 are disposed between the arcuate portions of the cam 64 and the annulus 46 for selectively releasing the bidirectional brake for rotation thereof in either of but not both directions, at any one time. Thus, if the fingers 72 are moved in the clockwise direction as viewed in FIGURE 2, the annulus 46 will be free to rotate in the counterclockwise direction. Conversely, if the fingers 72 are moved in the counterclockwise direction, the annulus 46 will be free to rotate in the clockwise direction.

Referring again to FIGURE 2, the cam 64 is formed with an integral hub 74 and is restrained against rotation by bars, or fingers, 76 which are interlocked with the notched hub 74. The lock release fingers 72 extend axially outward from an annulus 78 journalled on the hub of an output member 80, in the form of a lever. The hub of the output member 80 is connected by a cross pin 82 with the shaft 52. The annulus 78 has an upstanding pin 84 received by a clevis 86 of a lever 88 pivoted at 90 to a fixed support 92. The lever 88 is in the form of a bellcrank and carries a cam follower 94 which is situated in the cam groove 32.

As alluded to hereinbefore, the unidirectional electric motor 62 is preferably continuously energized so that intermittent torque impulses in opposite directions are imparted to the carrier 48 and the spur gear 44. When the input member 10 is in a null position, the cam follower 94 is situated in the oblique portion 38 of the cam groove 32. In this position the fingers 72 of annulus 78 do not engage either of the rollers 68 of the several pairs, and, accordingly, the brake is locked in both directions and the oppositely acting torque impulses produced by the eccentrically weighted rotating planet gears 56 impart no movement to the output member 80.

However, when the input member 10 is moved in either direction from a null position, angular movement is imparted to the differential input gear 14 and through differential gears 16 and 18 imparts angular movement in one direction or the other to the ring 30. At this time the gear 20 is stationary since the brake is locked in both directions. Angular movement of the ring 30 will impart pivotal movement to the bellcrank 88 which, through the clevis 86 and pin 84, will impart angular movement to the annulus 78 and the lock release fingers 72. Thus, the bidirectional brake will be released for rotation in one direction. Accordingly, the torque impulses created by rotation of the eccentrically weighted planet gears 56 will be imparted to the spur gear 44 and the shaft 52 so as to rotate the output member 80 to exactly follow-up the movement of the input member 10. During this movement the ring 30 will be driven in the opposite direction through gear 40 and input bevel gear 20 so that when the output member 80 has moved through exactly the same angular direction as the input member 10, the follower 94 will again be positioned in the oblique portion 38 of the cam groove 32 whereat the bellcrank 88 will reposition the fingered annulus 78 to reengage the bidirectional brake.

While the embodiment of the invention as herein disclosed constitutes a preferred form, it is to be understood that other forms might be adopted.

What is claimed is as follows:

1. A closed loop servo system including, a manually positionable input member, an output member, actuating means for positioning said output member including a rotary driving member, mass inertia means driven by said driving member for producing torque impulses in opposite directions during rotation of said driving member and a bidirectional drive release brake operatively interconnecting said mass inertia means and said output member for permitting rotation of said output member in either of, but not both directions, at any one time, means operatively interconnecting said input member and said bidirectional brake for selectively releasing the same for rotation in either direction, and follow-up means drivingly connected with said output member for reengaging said bidirectional brake when the output member has followed-up the movement of said input member.

2. A closed loop servo system including, a manually positionable input member, an output member, actuating means for positioning said output member including rotary driving means, mass inertia means driven by said driving means for producing torque impulses in opposite directions during rotation of said driving means and a bidirectional drive release brake operatively interconnecting said mass inertia means and said output member for permitting rotation of said output member in either of, but not both directions, at any one time, means operatively interconnecting said input member and said brake for selectively releasing the same for rotation in either direction, and follow-up means drivingly connected with said output member to reengage said brake after said output member has followed-up the movement of said input member.

3. A closed loop servo system including, a manually positionable input member, an output member, actuating means for positioning said output member including rotary driving means, mass inertia means driven by said driving means for producing torque impulses in opposite directions during rotation of said driving means and a bidirectional drive release brake operatively interconnecting said mass inertia means and said output member for permitting rotation of said output member in either of, but not both directions, at any one time, cam means for controlling said brake, means operatively interconnecting said input member and said cam means to release said brake for rotation in either direction, and follow-up means drivingly connected with said output member to reposition said cam means for reengaging said brake when the output member has followed-up the movement of said input member.

4. A closed loop servo system including, a manually positionable input member, an output member, actuating means for positioning said output member including rotary driving means, mass inertia means driven by said driving means for producing rotation of said driving means and a bidirectional drive release brake interconnecting said mass inertia means and said output member for permitting rotation of said output member in either of, but not both directions, at any one time, a rotatable cam, a follower engaging said cam and controlling said brake, a differential gear set for positioning said cam, means interconnecting said input member and said differential gear set to release said brake for rotation in either direction, and follow-up means drivingly connected with said output member and with said differential gear set to reengage said brake when the output member has followed-up the movement of said input member.

5. The closed loop servo system set forth in claim 4 wherein said cam comprises an annulus having a peripheral cam groove therein, and where said differential gear set comprises a pair of input gears and a pair of output gears carried by said annulus.

6. The closed loop servo system set forth in claim 4 wherein said bidirectional drive release brake comprises an annulus, a stationary cam coaxially disposed within said annulus having a plurality of circumferentially spaced flats, a pair of rollers mounted on each flat and spring biased into engagement with said cam and said annulus, and a fingered lock releasing member disposed between said cam and said annulus.

7. The combination set forth in claim 6 wherein said cam follower is carried by a lever, and means interconnecting said lever and said fingered lock releasing member.

8. The servo system set forth in claim 6 wherein said mass inertia means includes a pair of eccentrically weighted planet gears, a carrier supporting said planet gears, and means connecting said carrier with said annulus.

References Cited in the file of this patent

UNITED STATES PATENTS

| | | |
|---|---|---|
| 1,718,074 | Reece et al. | June 18, 1929 |
| 2,209,695 | Heize | July 30, 1940 |
| 2,344,384 | Horstman | Feb. 5, 1946 |
| 2,723,568 | Summers | Nov. 15, 1955 |
| 2,993,569 | Cole | July 25, 1961 |